(12) United States Patent
Sivasubramanian et al.

(10) Patent No.: US 8,447,831 B1
(45) Date of Patent: *May 21, 2013

(54) INCENTIVE DRIVEN CONTENT DELIVERY

(75) Inventors: Swaminathan Sivasubramanian, Seattle, WA (US); David R. Richardson, Seattle, WA (US); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 577 days.

This patent is subject to a terminal disclaimer.

(21) Appl. No.: 12/060,143

(22) Filed: Mar. 31, 2008

(51) Int. Cl.
*G06F 15/16* (2006.01)

(52) U.S. Cl.
USPC ........... 709/217; 709/216; 709/218; 709/226; 709/230; 709/238

(58) Field of Classification Search
USPC .................. 709/216, 217, 218, 226, 230, 238
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,892,914 A | 4/1999 | Pitts | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,275,496 B1 | 8/2001 | Burns et al. | |
| 6,286,043 B1 | 9/2001 | Cuomo et al. | |

(Continued)

FOREIGN PATENT DOCUMENTS

| CN | 1422468 A | 6/2003 |
|---|---|---|
| WO | WO 2007/007960 A1 | 1/2007 |
| WO | WO 2012/044587 A1 | 4/2012 |

OTHER PUBLICATIONS

International Search Report and Written Opinion in PCT/US2011/053302 mailed Nov. 28, 2011 in 11 pages.

(Continued)

*Primary Examiner* — Harunur Rashid
(74) *Attorney, Agent, or Firm* — Knobbe, Martens, Olson & Bear, LLP

(57) ABSTRACT

A system and method for management and processing of resource requests are provided. A content delivery network service provider receives a DNS query from a client computing device corresponding to a requested resource from the client computing device. The content delivery network service provider associates the requested content into a set of content segments. For each content segment, the content delivery network service provider identifies the network address of a registered content provider, such as peer computing device, and a cache component of the content delivery service provider. The content delivery network service provider also provides tokens for requesting the content from a registered content provider. The client computing device obtains the content from the registered content providers and/or the cache component of the content delivery network service provider. Thereafter, the content delivery network service provider reconciles with the registered content providers for content provided to client computing devices.

13 Claims, 9 Drawing Sheets

U.S. PATENT DOCUMENTS

| | | |
|---|---|---|
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,654,807 B2 * | 11/2003 | Farber et al. ........... 709/225 |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 * | 3/2006 | Lewin et al. ........... 709/217 |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton et al. |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,962,597 B2 | 6/2011 | Richardson et al. |
| 7,966,404 B2 | 6/2011 | Hedin et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,321,568 B2 | 11/2012 | Sivasubramanian et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0116481 A1 | 8/2002 | Lee |
| 2002/0124098 A1 | 9/2002 | Shaw |
| 2002/0129123 A1 | 9/2002 | Johnson et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0156911 A1 | 10/2002 | Croman et al. |
| 2002/0163882 A1 | 11/2002 | Bornstein et al. |
| 2003/0002484 A1 | 1/2003 | Freedman |
| 2003/0009591 A1 | 1/2003 | Hayball et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0099202 A1 | 5/2003 | Lear et al. |
| 2003/0101278 A1 | 5/2003 | Garcia-Luna-Aceves et al. |

| | | |
|---|---|---|
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0174648 A1 | 9/2003 | Wang et al. |
| 2003/0182413 A1 | 9/2003 | Allen et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044791 A1 | 3/2004 | Pouzzner |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1* | 6/2005 | Raciborski et al. ............ 709/232 |
| 2005/0157712 A1 | 7/2005 | Rangarajan et al. |
| 2005/0163168 A1 | 7/2005 | Sheth et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0216569 A1 | 9/2005 | Coppola et al. |
| 2005/0216674 A1 | 9/2005 | Robbin et al. |
| 2005/0232165 A1* | 10/2005 | Brawn et al. .................. 370/255 |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0047787 A1 | 3/2006 | Agarwal et al. |
| 2006/0063534 A1 | 3/2006 | Kokkonen et al. |
| 2006/0064500 A1 | 3/2006 | Roth et al. |
| 2006/0074750 A1* | 4/2006 | Clark et al. ..................... 705/14 |
| 2006/0075084 A1 | 4/2006 | Lyon |
| 2006/0075139 A1 | 4/2006 | Jungck |
| 2006/0083165 A1 | 4/2006 | McLane et al. |
| 2006/0112176 A1* | 5/2006 | Liu et al. ....................... 709/223 |
| 2006/0120385 A1 | 6/2006 | Atchison et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0227740 A1 | 10/2006 | McLaughlin et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259984 A1 | 11/2006 | Juneau |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1 | 3/2007 | Dilley et al. |
| 2007/0076872 A1 | 4/2007 | Juneau |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0183342 A1 | 8/2007 | Wong et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0253377 A1 | 11/2007 | Janneteau et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |

| | | |
|---|---|---|
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1* | 12/2008 | Golan et al. ............. 705/14 |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1* | 6/2009 | Gagliardi et al. ............. 709/219 |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | Dacosta |
| 2009/0204682 A1 | 8/2009 | Jeyaseelan et al. |
| 2009/0210549 A1 | 8/2009 | Hudson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0125673 A1 | 5/2010 | Richardson et al. |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Baglioni et al., "Preprocessing and Mining Web Log Data for Web Personalization", LNAI 2829, 2003, pp. 237-249.
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
Supplementary European Search Report in Application No. 09727694.3 mailed Jan. 30, 2012 in 6 pages.
First Office Action in Chinese Application No. 200980119993.1 dated Jul. 4, 2012.
First Office Action in Chinese Application No. 200980119995.0 dated Jul. 6, 2012.
Office Action issued in U.S. Appl. No. 12/059,997 dated Jun. 9, 2010.
Office Action issued in U.S. Appl. No. 12/059,997 dated Jan. 7, 2011.
Office Action issued in U.S. Appl. No. 12/060,013 dated Dec. 1, 2009.
Office Action issued in U.S. Appl. No. 12/060,013 dated Aug. 23, 2010.
Office Action issued in U.S. Appl. No. 12/060,015 dated Nov. 3, 2010.
Office Action issued in U.S. Appl. No. 12/060,015 dated Mar. 31, 2011.
Office Action issued in U.S. Appl. No. 12/060,124 dated Jul. 12, 2010.
Notice of Allowance issued in U.S. Appl. No. 12/060,124 dated Feb. 23, 2011.
Notice of Allowance issued in U.S. Appl. No. 13/170,102 dated Aug. 8, 2011.
Office Action issued in U.S. Appl. No. 13/296,189 dated Feb. 22, 2012.
Office Action issued in U.S. Appl. No. 12/060,173 dated Jul. 8, 2010.
Notice of Allowance issued in U.S. Appl. No. 12/060,173 dated Feb. 1, 2011.
Office Action issued in U.S. Appl. No. 13/098,366 dated Aug. 8, 2011.
Notice of Allowance issued in U.S. Appl. No. 13/098,366 dated Nov. 7, 2011.
Office Action issued in U.S. Appl. No. 12/060,202 dated May 13, 2010.
Office Action issued in U.S. Appl. No. 12/060,202 dated Nov. 9, 2010.
Office Action issued in U.S. Appl. No. 12/060,202 dated Jan. 19, 2012.
Office Action issued in U.S. Appl. No. 12/060,020 dated Jun. 28, 2012.
Office Action issued in U.S. Appl. No. 12/060,213 dated Jun. 17, 2010.
Office Action issued in U.S. Appl. No. 12/060,213 dated Nov. 10, 2010.
Office Action issued in U.S. Appl. No. 12/060,213 dated Mar. 22, 2012.
Office Action issued in U.S. Appl. No. 12/198,019 dated Jul. 30, 2010.
Office Action issued in U.S. Appl. No. 12/198,019 dated Feb. 8, 2011.
Office Action issued in U.S. Appl. No. 12/189,019 dated Aug. 19, 2011.
Office Action issued in U.S. Appl. No. 12/956,823 dated Aug. 5, 2011.
Office Action issued in U.S. Appl. No. 12/956,823 dated Jan. 6, 2012.
Office Action issued in U.S. Appl. No. 12/956,647 dated Aug. 5, 2011.
Office Action issued in U.S. Appl. No. 12/956,647 dated Jan. 13, 2012.
Office Action issued in U.S. Appl. No. 12/956,748 dated Jun. 23, 2011.

Office Action issued in U.S. Appl. No. 12/956,748 dated Nov. 10, 2011.
Office Action issued in U.S. Appl. No. 12/956,566 dated Jul. 8, 2011.
Office Action issued in U.S. Appl. No. 12/956,566 dated Jan. 5, 2012.
Office Action issued in U.S. Appl. No. 12/165,343 dated Mar. 22, 2010.
Office Action issued in U.S. Appl. No. 13/042,301 dated Aug. 24, 2011.
Office Action issued in U.S. Appl. No. 12/412,456 dated May 16, 2011.
Office Action issued in U.S. Appl. No. 12/412,456 dated Mar. 12, 2012.
Office Action issued in U.S. Appl. No. 12/412,431 dated Mar. 8, 2011.
Office Action issued in U.S. Appl. No. 12/272,681 dated Nov. 26, 2010.
Office Action issued in U.S. Appl. No. 12/272,681 dated Apr. 27, 2011.
Office Action issued in U.S. Appl. No. 12/272,666 dated Feb. 23, 2011.
Notice of Allowance issued in U.S. Appl. No. 12/272,666 dated Aug. 25, 2011.
Office Action issued in U.S. Appl. No. 13/296,156 dated May 15, 2012.
Notice of Allowance issued in U.S. Appl. No. 13/296,156 dated Jun. 8, 2012.
Office Action issued in U.S. Appl. No. 12/412,443 dated Mar. 15, 2012.
Office Action issued in U.S. Appl. No. 12/272,687 dated Sep. 9, 2010.
Office Action issued in U.S. Appl. No. 12/272,687 dated Feb. 3, 2011.
Notice of Allowance issued in U.S. Appl. No. 12/272,687 dated May 27, 2011.
Notice of Allowance issued in U.S. Appl. No. 13/232,878 dated Aug. 17, 2012.
Office Action issued in U.S. Appl. No. 12/272,655 dated Mar. 4, 2011.
Office Action issued in U.S. Appl. No. 12/272,655 dated Oct. 28, 2011.
Office Action issued in U.S. Appl. No. 12/272,699 dated Dec. 14, 2010.
Office Action issued in U.S. Appl. No. 13/299,169 dated Feb. 3, 2012.
Office Action issued in U.S. Appl. No. 12/272,683 dated Sep. 9, 2010.
Office Action issued in U.S. Appl. No. 12/272,683 dated Jan. 14, 2012.
Notice of Allowance issued in U.S. Appl. No. 13/165,484 dated Mar. 22, 2012.
Office Action issued in U.S. Appl. No. 12/272,715 dated Jan. 24, 2012.
Office Action issued in U.S. Appl. No. 12/272,715 dated Jun. 28, 2011.
Office Action issued in U.S. Appl. No. 13/358,476 dated Apr. 26, 2012.
Office Action issued in U.S. Appl. No. 12/272,641 dated Feb. 23, 2011.
Notice of Allowance issued in U.S. Appl. No. 12/272,641 dated Aug. 25, 2011.
Office Action issued in U.S. Appl. No. 13/299,229 dated May 7, 2012.
Office Action issued in U.S. Appl. No. 13/299,229 dated May 16, 2012.
Notice of Allowance issued in U.S. Appl. No. 13/299,229 dated Jun. 6, 2012.
Office Action issued in U.S. Appl. No. 12/722,454 dated May 31, 2012.
Office Action issued in U.S. Appl. No. 12/892,794 dated Jul. 23, 2012.
Office Action issued in U.S. Appl. No. 12/892,873 dated Aug. 1, 2012.
Office Action issued in U.S. Appl. No. 12/892,861 dated Aug. 21, 2012.
Office Action issued in U.S. Appl. No. 12/695,537 dated Mar. 30, 2012.
Office Action issued in U.S. Appl. No. 11/771,679 dated Apr. 30, 2010.
Office Action issued in U.S. Appl. No. 11/771,679 dated Sep. 1, 2010.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Singapore Examination Report in Application No. 201006837-7 mailed May 16, 2012.
International Search Report and Written Opinion in PCT/US2011/061486 mailed Mar. 30, 2012 in 11 pages.

* cited by examiner

INCENTIVE DRIVEN CONTENT DELIVERY

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the management and processing of resource requests made to a content delivery network ("CDN") service provider from client computing devices. Specifically, aspects of the disclosure will be described with regard to the utilization, by the CDN provider, of additional registered computing devices to provide requested content to the computing devices. As client computing device content requested are processed, the CDN provider provides an identification of registered computing devices that are capable of providing the requested content (or portions thereof) and a token for use in requesting content from the registered content providers. The client computing devices can then request the content (or content portions) from the registered content providers. Alternatively, the client computing device can request the content (or content portions) from a cache component of the CDN provider. The registered content providers can then utilize received tokens to reconcile with the CDN provider. Although various aspects of the disclosure will be described with regard to illustrative examples and embodiments, one skilled in the art will appreciate that the disclosed embodiments and examples should not be construed as limiting.

Figure 1:
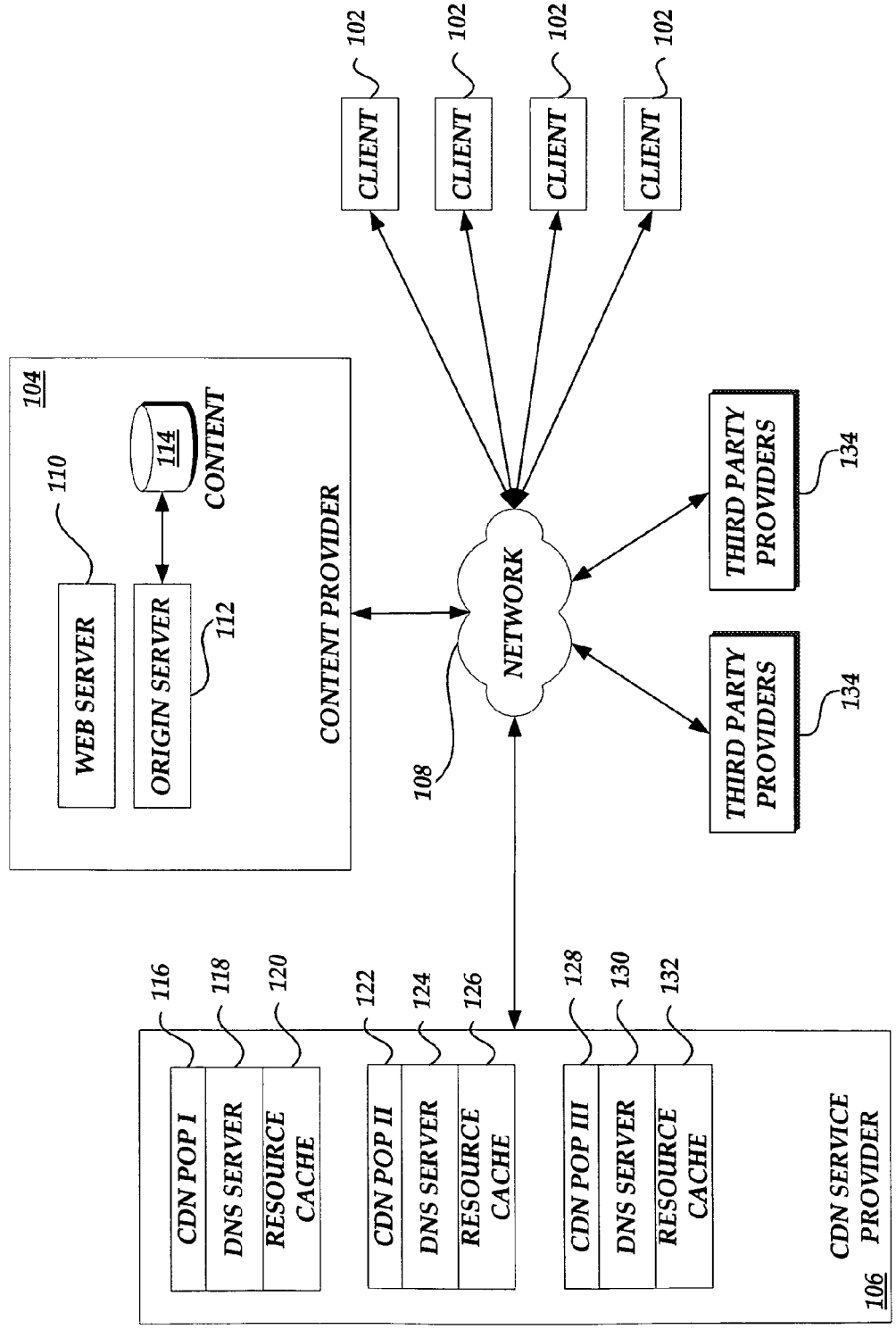
FIG. 1 is a block diagram illustrative of content delivery environment including a number of client computing devices, content provider, various third party content providers, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With continued reference to FIG. 1, the content delivery environment 100 can further include a number of third party content providers 134 that are registered with the CDN service provider 106. The CDN service provider 106 can utilize the third party content providers 134 to provide content, or content portions, as peer computing devices to requesting client computing devices 102 as will be described in greater detail below. The third party content providers 134 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. Additionally, the third party content providers 134 can include additional hardware and/or software components for delivering content to other computing devices via the communication network 108, such as Web server computing device, proxy server computing device, etc. The third party content providers 134 can obtain content specifically for distribution to client computing devices 102. In still a further embodiment, the third party content providers 134 can also be client computing devices 102 that have registered with the CDN provider 106 and can provide previously downloaded content previously to other client computing devices 102.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
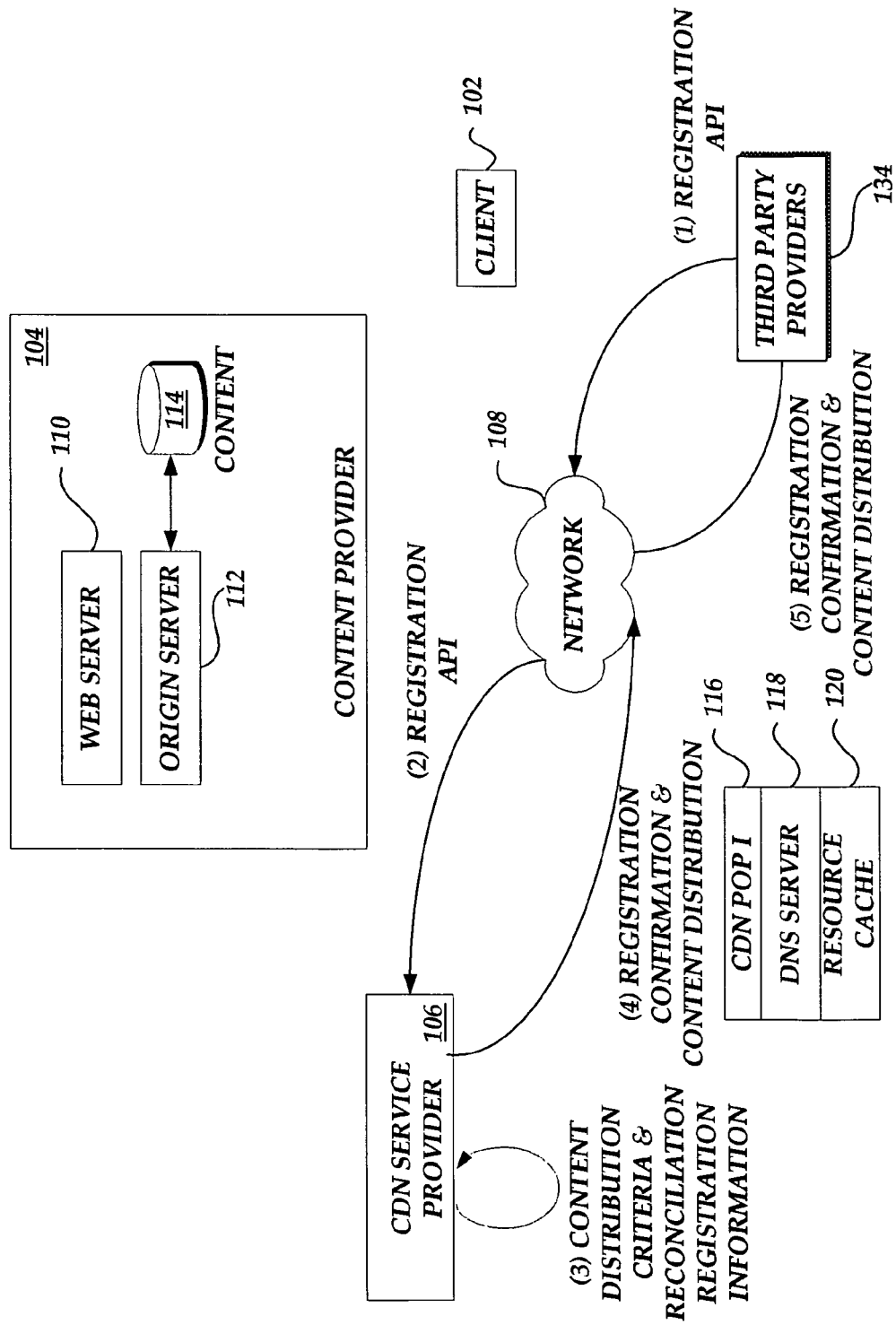
FIG. 2 is a block diagram of the content delivery environment of FIG. 1 illustrating the registration of third party content provider with a content delivery service provider.

With reference to FIG. 2, an illustrative interaction for registration of a third party content providers 134 with the CDN service provider 106 will be described. As illustrated in FIG. 2, the CDN content registration process begins with registration of the third party content providers 134 with the CDN service provider 106. In an illustrative embodiment, the third party content providers 134 utilizes a registration application program interface ("API") to register with the CDN service provider 106 such that the third party content providers 134 can provide content on behalf of the CDN service provider 106. The registration API includes the identification of the computing devices associated with the third party content providers 134 that will provide requested resources on behalf of the CDN service provider 106. Additionally, the registration API can include additional identification information used by the CDN service provider 106 to identify content previously downloaded by the third party content providers 134 and that is available for downloading by other client computing devices 102.

One skilled in the relevant art will appreciate that upon registration, the CDN service provider 106 can begin to direct requests for content from client computing devices 102 to the third party content providers 134. With continued reference to FIG. 2, upon receiving the registration API, the CDN service provider 106 obtains and processes the registration information. In an illustrative embodiment, the CDN service provider 106 can use the registration information to identify the criteria used to direct client computing device content requests to the specific third party content provider 134. Examples of the criteria include defining geographic information or network affiliation information that can be used in associating a network proximity, whether physical or logical, to an identified client computing device. The network proximity can be used as factor in identifying the third party content providers 134 as a possible source of content for a requesting client computing device.

In another embodiment, the CDN service provider 106 can also use the registration information to identify content previously downloaded by the third party content providers 134 (such as acting in the capacity as a client computing device 102). In still a further embodiment, the CDN service provider 106 can also use the registration information to establish, or otherwise confirm, financial or account information that the CDN service provider 106 will utilize to reconcile with the third party content provider 134 for content provided to client computing devices. For example, the CDN service provider 106 the financial or account information can corresponds to account information for a particular financial institution, user identifiers for additional third party services utilized to exchange value between parties, or other information utilized in accordance with a particular type of reconciliation used between the CDN service provider 106 and the third party content provider 134. One skilled in the relevant art will appreciate that various types of additional information may be generated by the CDN service provider 106.

The CDN service provider 106 returns a confirmation of the registration of the third party content provider 134. Additionally, in an illustrative embodiment, the CDN service provider 106 can begin providing content to the third party content provider 134, or instructions for downloading content from a cache server component of a POP, such as POP 116. The third party content provider 134 obtains the confirmation and begins performing any additional activity in correspondence with the confirmed registration, such as preparing previously downloaded content or downloading identified content in anticipation of incoming requests from the client computing devices 102.

Figure 3:
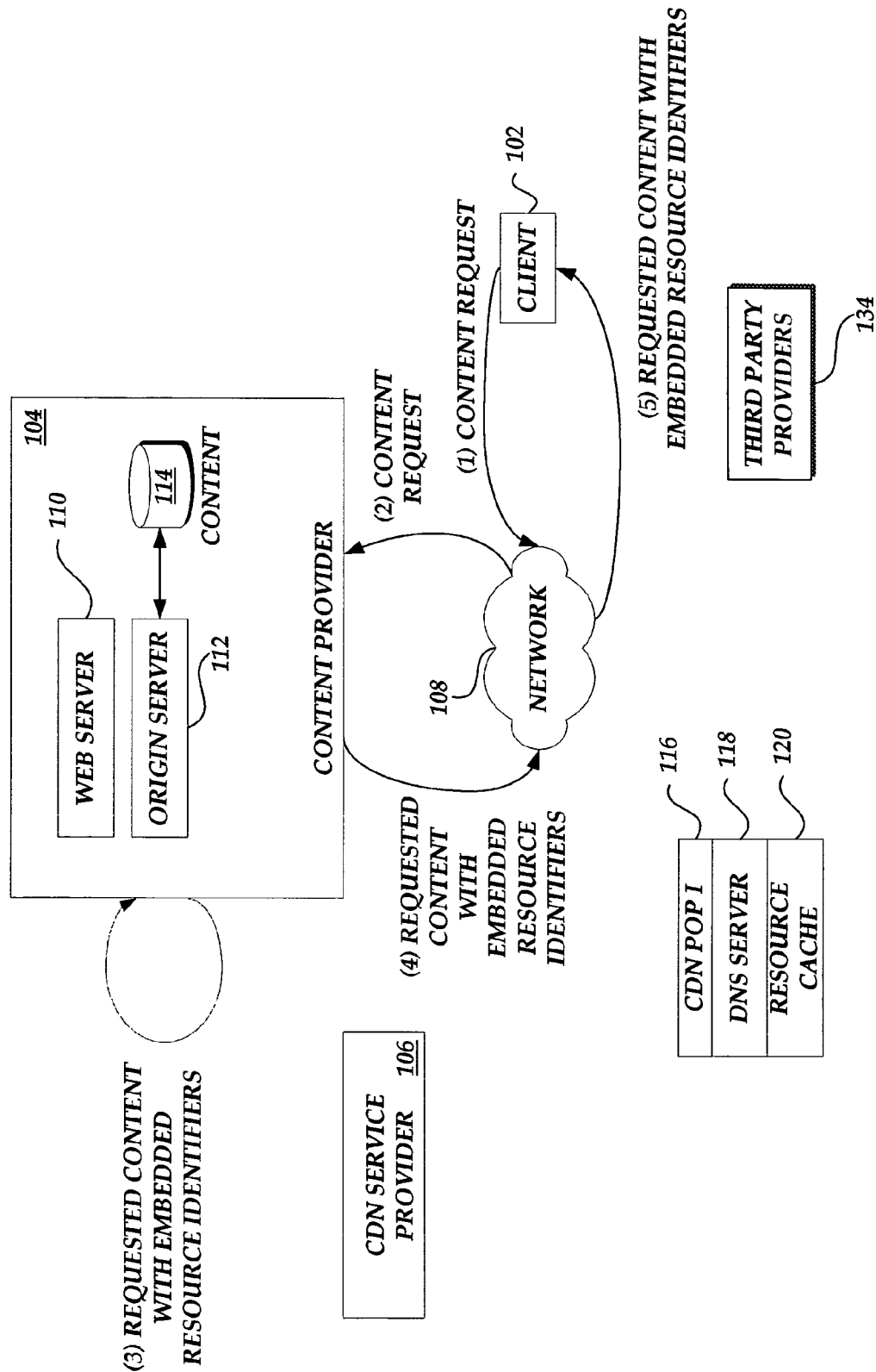
FIG. 3 is a block diagram of the content delivery environment of FIG. 1 illustrating the generation and processing of a content request from a client computing device to a content provider.

With reference now to FIG. 3, after completion of the registration processes illustrated in FIG. 2, the third party content provider 134 is available as a provider for requested content. Accordingly, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that correspond to resource objects that should be obtained by the client computing device 102 as part of the processing of the requested content. The embedded resource identifiers can be generally referred to as original resource identifiers or original URLs.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process (not shown), the content provider URL can be modified such that requests for the resources associated with the translated URLs resolve to a POP associated with the CDN service provider 106 instead of the content provider 104. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resources.xxx

Figure 4:
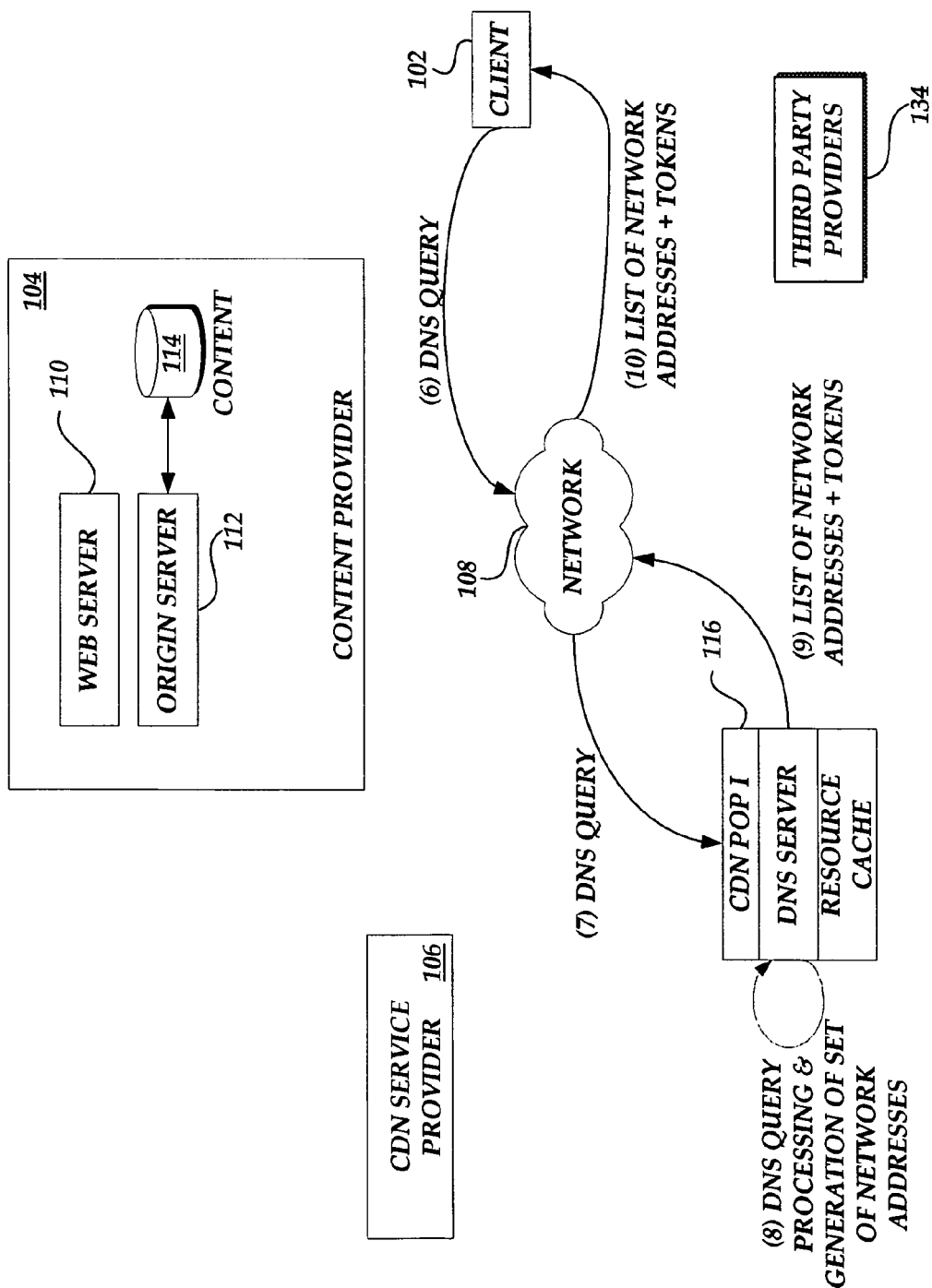
FIG. 4 is a block diagram of the content delivery environment of FIG. 1 illustrating one embodiment of the generation and processing of a DNS query corresponding to an embedded resource from a client computing device to a content delivery network service provider.

In another embodiment, the information associated with the CDN service provider 106 is included in the modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 4, upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the Original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

In an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 4, a specific DNS server resolves the DNS query by identifying a set of network addresses, such as IP addresses, of computing devices that will process the request for the requested resource. The set of network addresses can include one or more IP addresses that correspond to specific computing devices. Alternatively, the IP address can correspond to a hardware/software selection component (such as a load balancer) that will be used to direct a subsequent content request from the client computing device to a specific computing device. In an illustrative embodiment, the set of network addresses includes a network address for one or more third party content providers 134 and one or more cache components of a POP associated with the CDN service provider 106.

With further reference to FIG. 4, the specific DNS server can utilize a variety of information in selecting the set of network addresses returned to the client computing device 102. In an illustrative embodiment, the DNS server can determine a class, or cluster, associated with the requesting client computing device. For example, the class can correspond to a specific geographic region to which the client computing device belongs or an internet service provider for the client computing device. Such class information can be determined from the client directly (such as information provided by the client computing device or ISP) or indirectly (such as inferred through a client computing device's IP address). The DNS server can also utilize specific network topology information to identify network commonality, or network proximities, between the client computing device 102 and third party content providers 134.

In another embodiment, the specific DNS can utilize information about the third party content providers 134 in generating the set of network addresses. For example, third party providers 134 may be selected if it has previously downloaded the requested content or portions of the requested content. The third party providers 134 may also be selected based on a network proximity to the client computing device 102, contractual agreements between the CDN service provider 106 and the specific third party provider 134 (e.g., specifying a specific number of client computing device content requests), geographic criteria associated by the CDN service provider (such as associating the geographic criteria of a resource cache component to a content provider), or other selection criteria.

With continued reference to FIG. 4, in addition to the set of network addresses, the CDN service provider 106 also provides reconciliation information, such as electronic tokens, for use by the third party content providers 134. In an illustrative embodiment, the reconciliation information will be provided accompanied by any resource request submitted by the client computing device 102 to an identified third party content provider 134. For additional security/integrity purposes, the CDN service provider 106 can included additional information in the electronic tokens, such as a client computing device identifier information, timestamp information, third party content provider 134 identifiers, and the like. For example, a client computing device identifier can be incorporated into the electronic information, such via a hashing algorithm, in an effort to limit unauthorized duplication of the electronic tokens or fraudulent or repetitive reconciliations by a third party content provider 134. One skilled in the relevant art will appreciate that any one of a variety of electronic token, micropayment, or credit management methodologies may be incorporated in the CDN environment for reconciling content provided by a third party content provider 134.

Figure 5A:
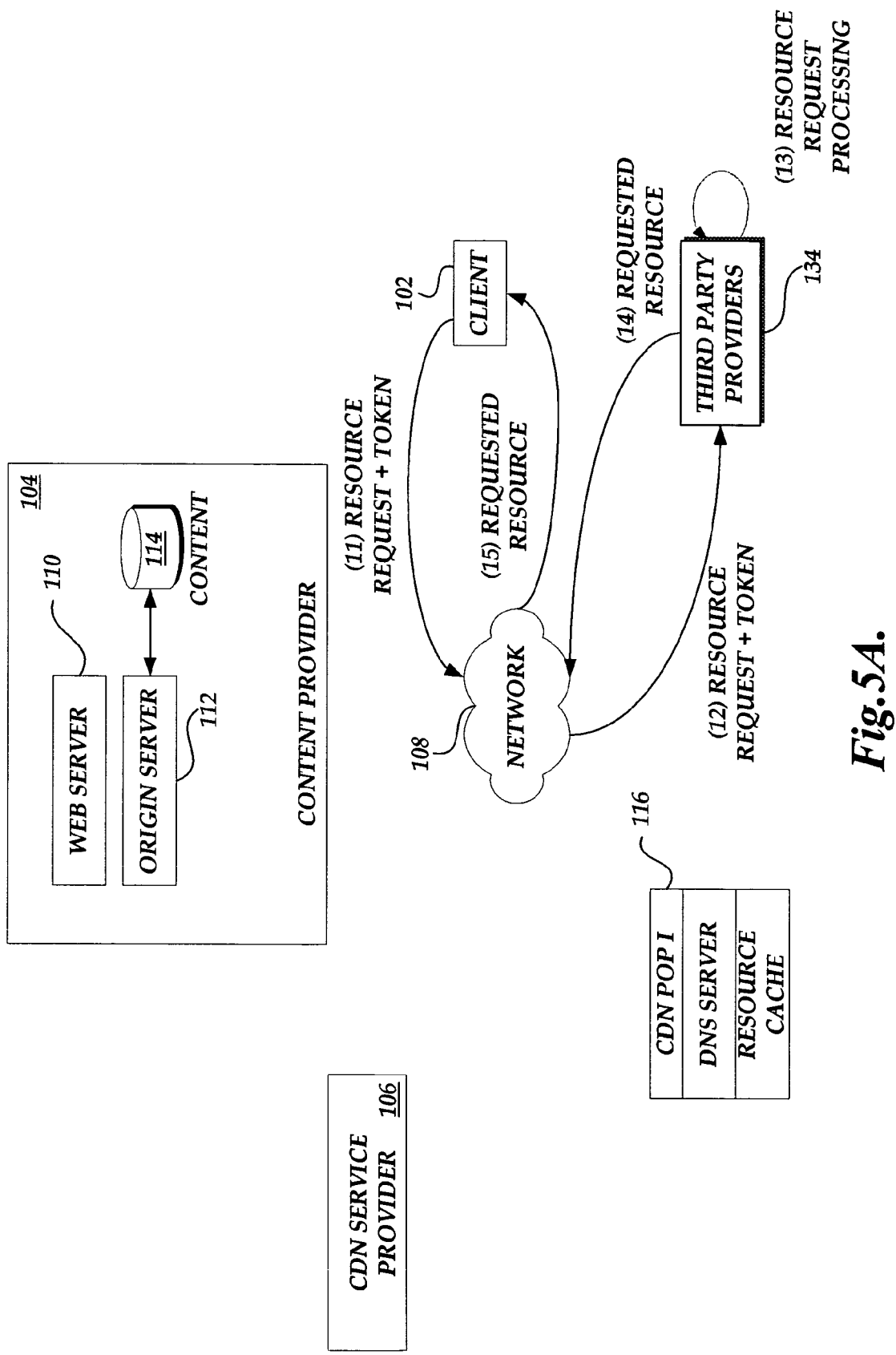
FIGS. 5A and 5B are block diagrams of the content delivery environment of FIG. 1 illustrating the generation and processing of embedded resource requests from a client computing device to the third party content providers and/or content delivery service provider cache components.
Figure 5B:
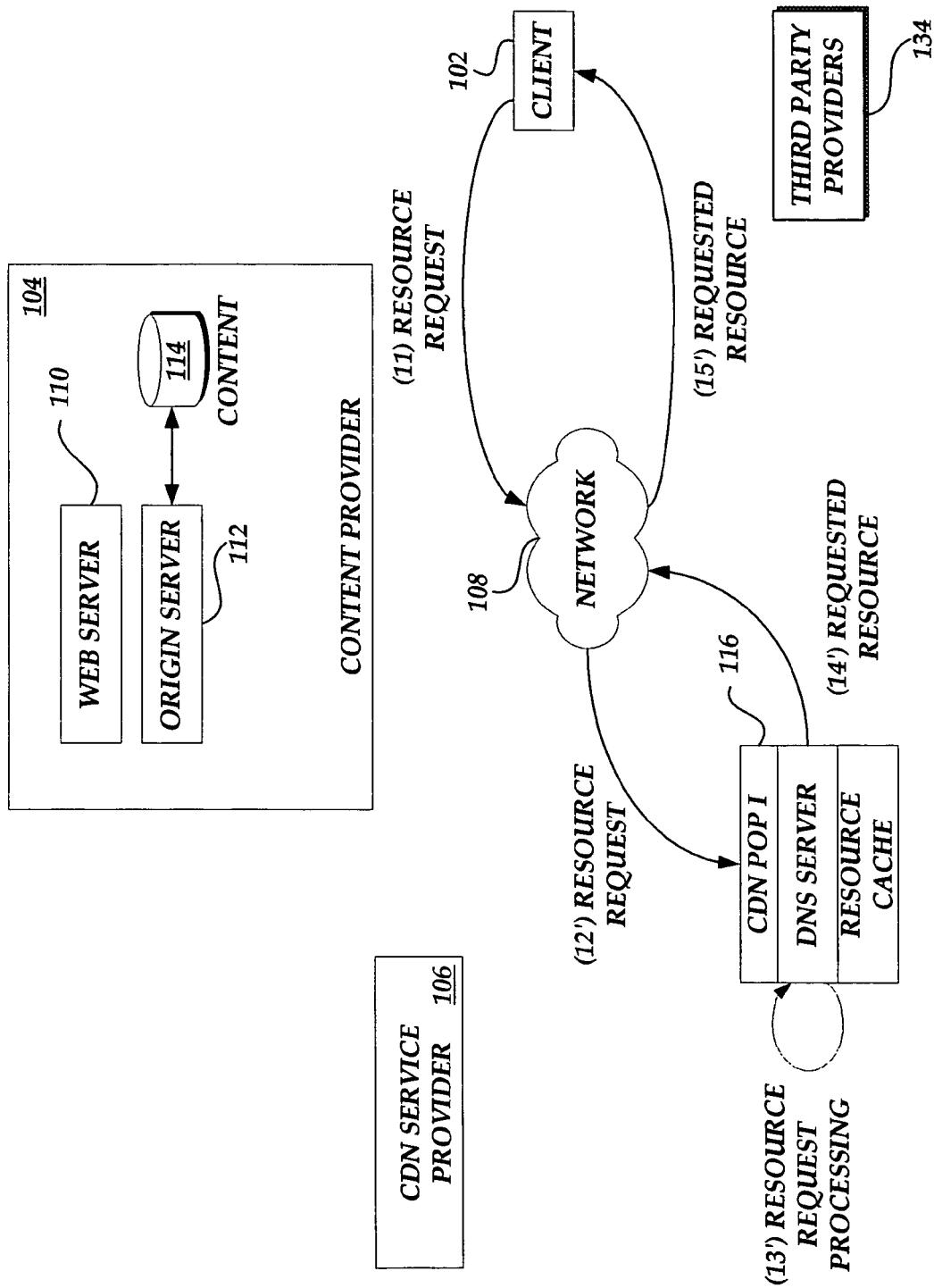

With reference now to FIGS. 5A and 5B, alternative steps implemented by a client computing device 102 to obtain requested content (e.g., content corresponding to the embedded URLs) from a third party content provider 134 or from a resource cache component 120, respectively, will be described. In an illustrative embodiment, the requested content may be segmented into a set of smaller content segments or content chunks. The CDN service provider 106 may utilize any one of a number of segmentation algorithms or methodologies for processing requested content into segments/chunks. In one example, each content segment/content chunk may be of a standardized size such that the requested content can be segment into a set of standard sized chunks. In another example, the content segment/content chunks may be of varied size as determined by the segmentation algorithm, For example, content segment/content chunk size may be selected to improve transmission speeds of the content segments/chunks, for mitigating storage utilization of the content segments/chunks, for defining common repetitive data within content (e.g., repetitive use of the same segment/chunk) or based otherwise processing the requested content. Accordingly, the interactions illustrated in FIGS. 5A and 5B may be implemented such that the CDN service provider 106 identifies a set of network addresses for each content segment/content segment, or alternatively, a set of network addresses cumulatively capable of providing all of the content segments/content chunks making up the requested content.

With reference to FIG. 5A, the client computing device 102 transmits a request for the requested content and the reconciliation information (e.g., the electronic token) to a third party provider 134 in the set of network addresses provided by the CDN service provider 106. In an illustrative embodiment, the client computing device 102 prioritizes requests for the content to third party providers 106 over requests for content to an identified resource cache component. The priority can be expressed in terms of the order of the listing of applicable network addresses in the set of network addresses provided by the CDN service provider 106. As previously described, the request for content can identify one or more content segments/content chunks of the requested content. Alternatively, the request for content can specify the content as a whole.

Upon receipt of the content request from the client computing device 102, the third party content provider 134 determines whether the requested content, or a portion of the requested content, is available. If the requested content, or portions thereof, is available the requested content is transmitted back to the client computing device 102 and the third party content provider 134 stores the reconciliation information (or otherwise validates its use). If the requested content is not available, but the third party content provider 134 has one or more content segments or content chunks available, the third party content provider 134 may transmit the available content segments/content chunks. Additionally, the third party content provider 134 may attempt to obtain any non-available content segments/content chunks from other sources, such as a resource cache component 120 or origin server 112 of the content provider 104. Alternatively, if the requested content (or content segment/chunk) is not available or if the client computing device 102 has specified for the entire requested content, the receiving third party content provider 134 can return a negative acknowledgement, error message, or other indication (including no indication) that the requested content or a portion of the requested content is unavailable.

With reference now to FIG. 5B, in an illustrative example, assuming that one or more content segments/content chunks are unavailable at the identified third party content providers 134, the client computing device 102 transmits requests for the requested content (or remaining portions thereof) to the resource cache component 120. The resource cache component 120 processes the request and the requested content (or portions thereof) is transmitted to the client computing device 102. If the requested content is not available, the resource cache component 120 may obtain the requested content portions from other POPs or from the origin server 112 of the content provider 104. At this point, it is assumed that the client computing device 102 has been provided the entire requested content from the specified third party content providers 134 or resource cache component 120, or combination thereof.

Figure 6:
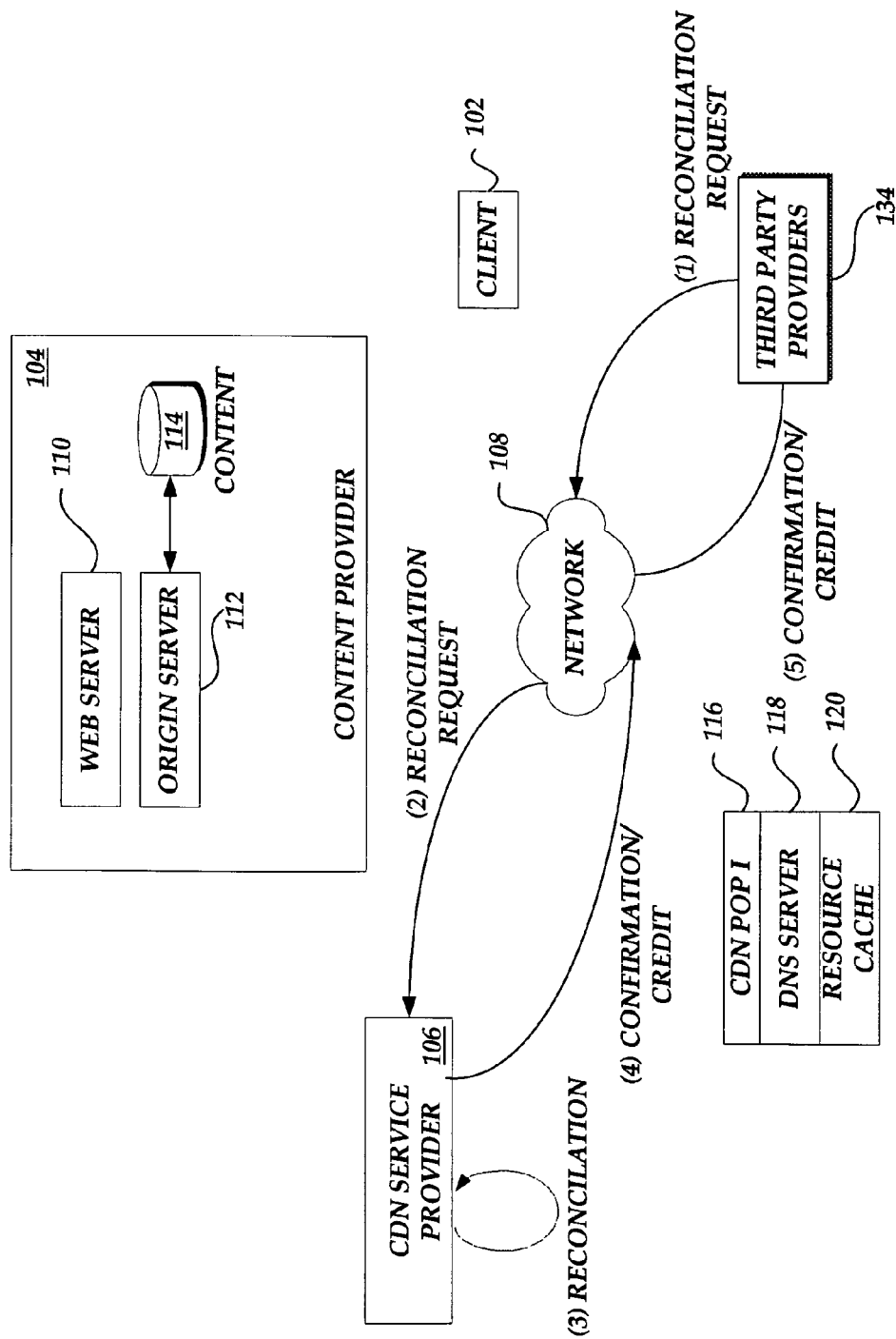
FIG. 6 is a block diagram of the content delivery environment of FIG. 1 illustrating the reconciliation for content provided to client computing devices by a third party content provider.

With reference now to FIG. 6, the third party content providers 134 may reconcile with the CDN service provider 106 for content provided on behalf of the CDN service provider 106 to client computing devices 102. The reconciliation may occur on a per transaction basis subsequent to the third party content provider 134 processing a content request from the client computing device 102. Alternatively, the reconciliation may occur as part of a bulk or batch request subsequent to a number of processed requests. The reconciliation request can include the electronic tokens collected from the client computing devices 102 as well as additional reconciliation information such as transaction logs, tracking or metric information and specific reconciliation instructions (e.g., account numbers or crediting preferences).

The CDN service provider 106 receives the reconciliation request and processes the request. In one embodiment, the CDN service provider 106 can perform security and/or verification processes to the reconciliation requests. For example, the CDN service provider 106 can utilize various client computing device identifiers to identify potential fraudulent transactions. Additionally, the CDN service provider 106 can also perform additional actions or collect additional information (such as confirmation from a client computing device). As appropriate, the CDN service provider 106 can then reconcile with the third party content provider 134 as appropriate. For example, the CDN service provider 106 can initiate for the crediting of an account associated with the CDN service provider 106. In another example, the CDN service provider 106 can interface with a network resource, such as a Web service or Web site, to initiate an appropriate credit. Still further, the CDN service provider 106 can update tracking information for later reconciliation or bulk reconciliation. The CDN service provider 106 then transmits a confirmation and/or any credit information. One skilled in the art will appreciate that the specific reconciliation acts will be dependent on one of a variety of reconciliation methods implemented by the CDN service provider 106. Accordingly, variations or alternatives in accordance with a selected reconciliation method are considered to be within the scope and spirit of the present disclosure and the illustrative examples should not be construed as limiting.

Figure 7:
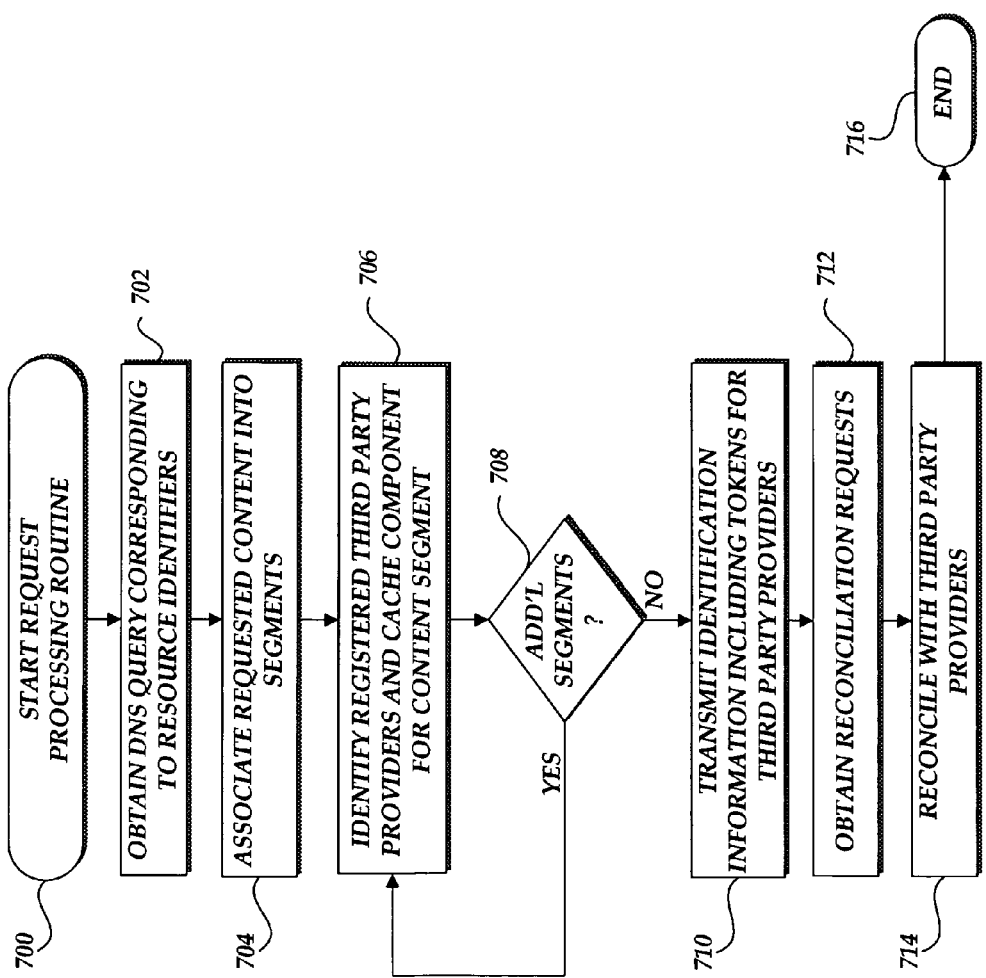
FIG. 7 is a flow diagram illustrative of a resource request processing routine implemented by a content delivery network service provider.

With reference now to FIG. 7, one embodiment of a content request processing routine 700 implemented by the CDN service provider 106 for processing a resource request from a client computing device 102 will be described. At block 702, the CDN service provider 106 obtains a DNS query from the client computing device 102 for one or more embedded URLs. As previously described, the embedded URLs can correspond to content to be requested in conjunction with a Web page provided by the content provider 104.

At block 704, the CDN service provider 106 associates the requested content into one or more content segments. As previously described, the requested content can be subdivided into a number of content segments or content chunks utilizing a variety of methodologies. At block 706, the CDN service provider 106 identifies one or more registered third party third party content providers 134 and resource cache components that can provide the requested content segment or content chunk. In an illustrative embodiment, the determination of which third party content providers 134 and/or resource cache components can be a function of the content previously provided, or otherwise previously stored, on the third party content provider 134 or resource cache component. Additionally, or alternatively, the determination of which third party content providers 134 and/or resource cache components can be a function of a network proximity (or other factors) regardless of whether the particular third party content providers 134 and/or resource cache components presently has the requested content. At decision block 708, a test is conducted to determine whether additional resource segments exist. If so, the routine 700 returns to block 706 for an identification of third party content providers 134 and/or resource cache components for the additional resource segments. One skilled in the relevant art will appreciate, however, that routine 700 may be implemented in a manner such that the CDN service provider 106 identifies third party content providers 134 and/or resource cache components for the requested content as a whole and not for content segments.

Once all the appropriate third party content providers 134 and/or resource cache components have been identified, at block 710, the CDN service provider 106 transmits identification and appropriate reconciliation information (e.g., electronic tokens) responsive to the client computing device 102 DNS query. As previously described, the identification information may be prioritized by order, or other prioritization information, such that the client computing device 102 will transmit resource requests to the third party content providers 134 prior to transmitting resource requests to an identified resource cache component. In an alternative embodiment, the CDN service provider 106 may transmit information, such as identifier information, that allows the client computing device 102 to utilize a network resource, such as a Web service, to obtain the appropriate reconciliation information or to otherwise allow the client computing device 102 to generate the appropriate reconciliation information locally.

At block 712, the CDN service provider 106 obtains reconciliation requests from one or more third party content providers 134. For purposes of this illustrative embodiment, it is assumed that the client computing device 102 has been successful in obtaining at least one content segment or content chunk from a third party content provider 134. As previously discussed, the third party content providers 134 may transmit the reconciliation requests upon completion of a content segment download to a client computing device 102 or alternatively, asynchronously, such as in a batch processing. The reconciliation requests can also include additional metric information or utilization information collected by the third party content provider 134 in processing the resource request from the client computing device 102.

At block 714, the CDN service provider 106 reconciles with the third party content providers 134. As previously disclosed, the CDN service provider 106 can reconcile in a variety of manners. In one example, the CDN service provider 106 may be credit a financial institution account associated with the third party content provider 134 or cause such an account to be credited. In another example, the CDN service provider 106 may interface with a network resource, such as Web service or Web site, to have a credit provided to an account or profile associated with third party content provider 134 (e.g., a rewards program). In still another example, the CDN service provider 106 may increment tracking information that tracks the transaction information. Such tracking information may be utilized by either the CDN service provider 106 or the third party content provider 134 at a later date. At block 716, the routine 700 terminates.

Figure 8:
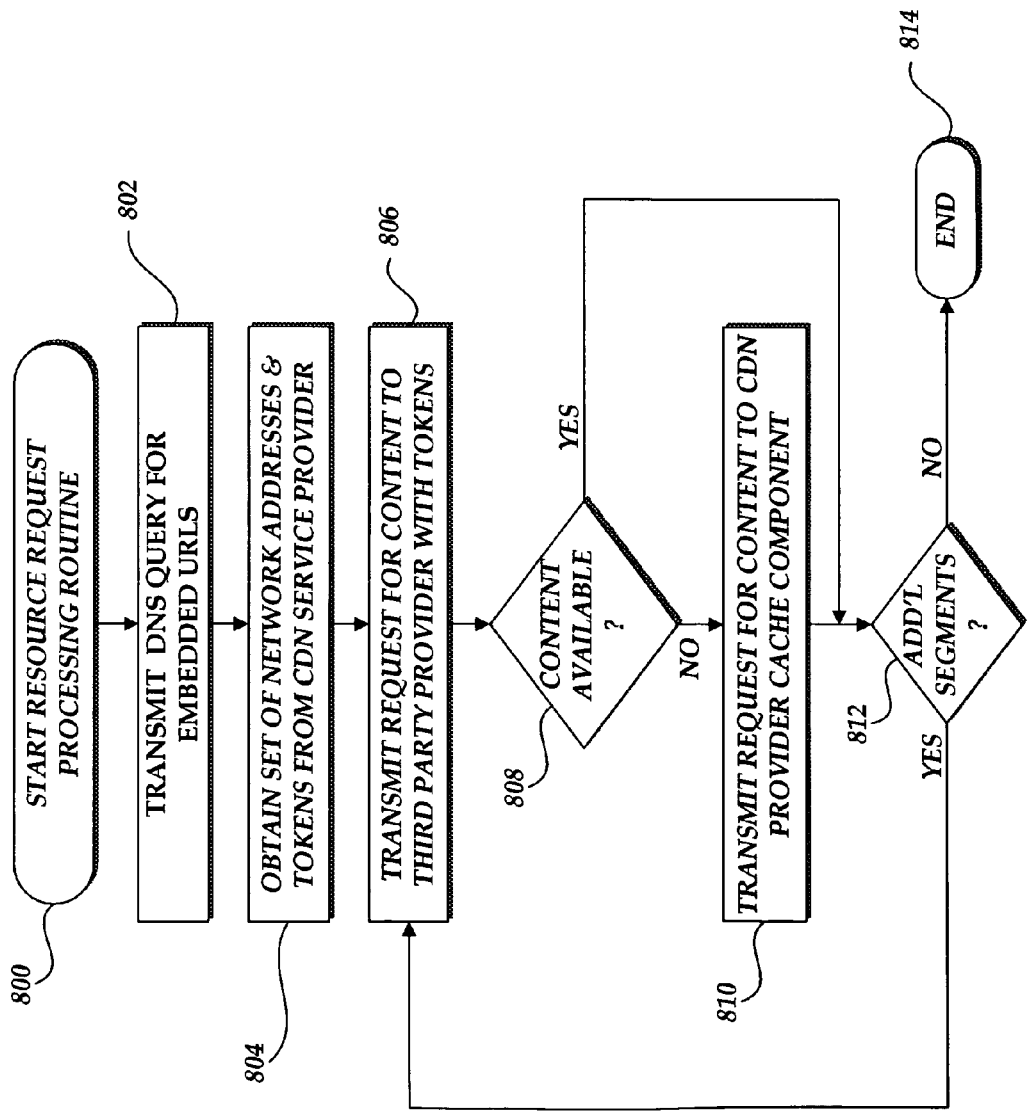
FIG. 8 is a flow diagram illustrative a resource request processing routine implemented by a client computing device for obtaining requested content from third party content providers and/or a content delivery service provider.

With reference now to FIG. 8, a request routing processing routine 800 implemented by a client computing device 102 will be described. At block 802, the client computing device 102 transmits a DNS query to the CDN service provider 106 for requested content. As previously stated, in an illustrative embodiment, the DNS query corresponds to embedded URLs in content (e.g., a Web page) provided by the content provider 104. At block 804, the client computing device 102 obtains a set of network addresses from the CDN service provider 106 in resolution of the DNS query. As previously described, the set of network addresses corresponds to an identification of third party content providers 134 and/or resource cache components that can process the resource request from the client computing device 102. Additionally, the set of network addresses may be prioritized to indicate the order in which the content should be requested by the client computing device 102. As previously discussed, in an illustrative embodiment, the requested content can be divided into various content segments or content chunks. Accordingly, the set of network addresses can be specified for each identifiable content segment or content chunk or alternatively, for the cumulative set of content segments/chunks.

At block 806, the client computing device 102 transmits a request for content to the identified third party provider(s) 134 in the set of network addresses. Additionally, the request for content can include the additional reconciliation information that will be utilized by the third party content provider 134 to reconcile with the CDN service provider 106. At decision block 808, a test is conducted to determine whether the requested content, or content segment, is available from the third party content provider 134. If so, the routine 800 proceeds to decision block 812, which will be described below. If the content is not available from the third party content provider 134 (or if the third party content provider 134 is otherwise unavailable), at block 810, the client computing device 102 transmits the content request to the resource cache component(s) identified in the set of network addresses. It is assumed that the receiving resource cache component will obtain the requested content if it is not previously available.

If the content is available from the third party content provider 134 at decision block 808 or once the content has been request from the resource cache component at block 810, at decision block 812, a test is conducted to determine whether additional content segments are to be requested. If so, the routine 800 returns to block 806 for request of the content from the third party content provider 134. If not, or if the content is otherwise not able to be segmented, the routine terminates at block 814.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing content comprising:
   obtaining a DNS query, by a content delivery network service provider, for content from a client computing device;
   determining at least one peer computing device for providing at least a portion of the requested content, wherein the at least one peer computing device is a third party computing device independent of the content delivery network service provider such that providing of content segments by the peer computing device requires reconciliation information not required by a cache component associated with the content delivery network service provider;
   resolving the DNS query by providing identification information identifying the at least one peer computing device for providing at least a portion of the requested content, wherein the identification information includes a network address of the identified peer computing device and a token for reconciling content provided by the peer computing device, and wherein the token for reconciling content provided by the peer computing device includes information to be used in providing reconciliation information by the client computing device to the at least one peer computing device; and
   obtaining a reconciliation request from the at least one peer computing device, wherein the reconciliation request includes reconciliation information based on the token for reconciling content provided by the client computing device.

2. The method as recited in claim 1, wherein determining at least one peer computing device for providing at least a portion of the requested content includes determining at least one peer computing device having a geographic proximity and at least a portion of the requested content.

3. The method as recited in claim 2, wherein the geographic proximity is based on a geographic coverage defined by the content service provider.

4. The method as recited in claim 1, wherein the requested content is associated into a set of content segments, and wherein determining at least one peer computing device for providing at least a portion of the requested content includes determining at least one peer computing device for providing at least each segment in the set of content segments.

5. The method as recited in claim 4 further comprising distributing, by the content delivery network service provider, copies of each content segment in the set of content segments to peer computing devices in advance of obtaining the DNS query from the client computing device.

6. The method as recited in claim 1 further comprising:
   obtaining one or more reconciliation requests from the at least one peer computing device, wherein the one or more reconciliation requests include tokens received by the at least one peer computing device from client computing devices; and
   reconciling, by the content delivery network service provider, the one or more reconciliation requests from the at least one peer computing devices.

7. The method as recited in claim 6, wherein reconciling by the content delivery network service provider includes interfacing with a network resource.

8. A method comprising:
   transmitting, by a client computing device, a DNS query associated with content request to a content delivery network service provider;
   obtaining, by the client computing device, identification information responsive to the DNS query, wherein the identification information includes:
      a specification of a set of content segments comprising the requested content,
      network address information of at least one registered content provider and at least one cache component associated with the content delivery network service provider for providing each content segment in the set of content segments, and
      client computing device reconciliation information for requesting content segments from a registered content provider,
      wherein the at least one registered content provider is associated with a third party computing device independent of the content delivery network service provider such that providing of content segments by the registered content provider requires reconciliation information not required by the at least one cache component associated with the content delivery network service provider; and
   transmitting requests for the content segments in accordance with the identification information, wherein requests transmitted to the registered content provider include reconciliation information based upon the client computing device reconciliation information, and wherein the requests transmitted to the registered content provider are used by the registered content provider to request reconciliation from the content delivery network service provider.

9. The method as recited in claim 8, wherein the reconciliation information includes an electronic token that includes information associated with a client computing device.

10. The method as recited in claim 8, wherein transmitting requests for the content segments in accordance with the identification information includes:
    determining, by the client computing device, whether copies of the content segments are available on the client computing device;
    if a copy of the content segments are not available, requesting, by the client computing device, unavailable content segments from the registered content providers in the identification information along with the reconciliation information; and
    if the any content segment is also unavailable from the registered content provider, requesting, by the client computing device, the unavailable content segments from the cache component associated with the content delivery network service provider.

11. A content delivery network comprising:
    at least one computing device distributing content to a set of registered peer computing devices;
    a DNS server component obtaining DNS queries from client computing devices and providing identification information responsive to the DNS query, wherein the identification information includes:
       a specification of a set of content segments comprising the requested content,
       network address information of at least one registered peer computing device and at least one cache component associated with a content delivery network service provider providing each content segment in the set of content segments, and
       reconciliation information requesting content segments from a registered peer computing device,
       wherein the reconciliation information includes information to be used in providing reconciliation information by the client computing device to the at least one registered peer computing device, and wherein the at least one registered peer computing device is a third party computing device independent of the content delivery network service provider such that providing of content segments by the registered peer computing device requires reconciliation information not required by the at least one cache component associated with the content delivery network service provider; and a cache component for providing requested content in lieu of the peer computing devices.

12. The content delivery network recited in claim 11, wherein the identification information is prioritized to define an order for requesting the content segments.

13. The content delivery network as recited in claim 11 further comprising means for reconciling content provided by the set of registered peer computing devices to the client computing device.

\* \* \* \* \*